Aug. 12, 1924.  
J. H. DEEN  
EDUCATIONAL GAME  
Filed July 31, 1923  
1,505,010
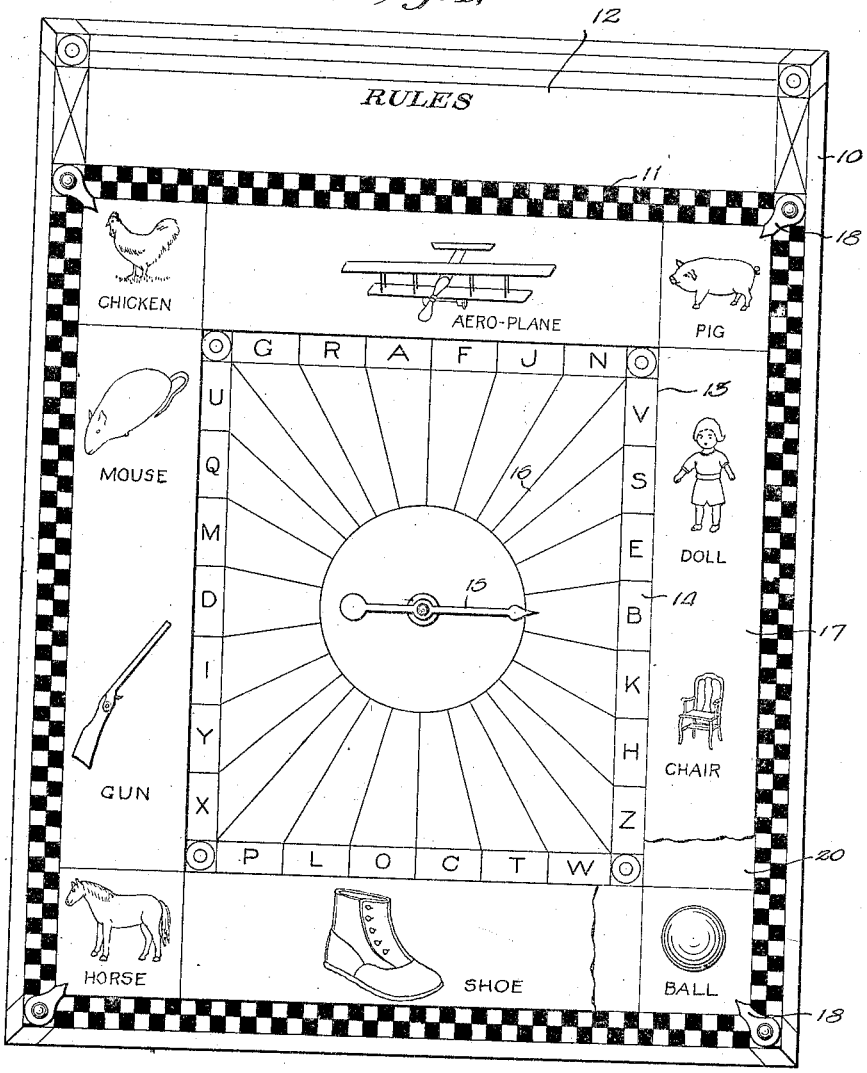
Fig. 1.
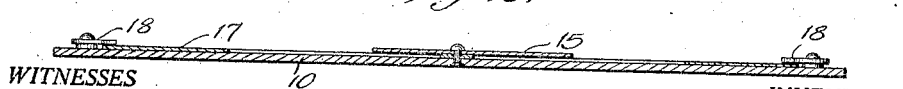
Fig. 2.
Fig. 3.
WITNESSES  
INVENTOR  
JAMES H. DEEN  
BY  
ATTORNEYS Patented Aug. 12, 1924.

1,505,010

UNITED STATES PATENT OFFICE.

JAMES H. DEEN, OF NEW YORK, N. Y.

EDUCATIONAL GAME.

Application filed July 31, 1923. Serial No. 654,899.

*To all whom it may concern:*

Be it known that I, JAMES H. DEEN, a citizen of the United States, and a resident of the city of New York, borough of Manhattan, in the county and State of New York, have invented new and useful Improvements in Educational Games, of which the following is a full, clear, and exact description.

This invention relates to educational games primarily designed for educating children.

Ability to spell correctly is of great value to the student and business man. In many cases the impressions given by incorrect spelling makes it impossible for people to succeed where they otherwise might have accomplished their object. The foundation for correct spelling is usually laid during the early years of one's life. However, it is only with great difficulty that the teacher is able to compel a child to concentrate on the art of spelling since to him the work is decidedly uninteresting. Therefore, any means that may be devised for interesting the child in learning to spell is of value to the teacher and to the child.

The general object of this invention is the provision of a game apparatus, entertaining in its operation and suited for the instructing of children to spell and to recognize different objects.

This object is accomplished by providing a game board and marking thereon a band of letters including some or all of the letters of the alphabet, mounting on the game board inside of said band of letters a spinner which upon operation indicates different letters, supplying a means for recording the letters indicated, and interchangeably mounting on the game board members shaped for enclosing the band of letters and having marked thereon a number of objects for suggesting words to be spelled by the use of the recorded letters.

This and other objects of the invention will be more clearly understood from the following detailed description and accompanying drawings.

Figure 1 is a top plan view of the educational game apparatus;

Figure 2 is an end elevation of the game apparatus showing its construction;

Figure 3 is a top plan view of a score pad provided for recording the letters.

Referring to the above-mentioned drawings, the invention includes a game board 10, divided into two sections by a border 11 which incloses the lower section. The upper section 12 of the game board is plain so that the rules may be marked thereon, locating them in a convenient place so that they may be consulted during the procedure of the game. The lower section enclosed by the border forms the main portion of the game board. Marked in this lower section of the game board are two rectangles, one inside the other, defining a rectangular band 13. This rectangular band is divided into a plurality of sections 14 and a letter is marked in each section except the corner sections. Marked in the corner sections are figures which give the rectangular band a balanced and symmetrical appearance. The area 20 located between the rectangular band 13 and the border 11 has marked thereon a plurality of objects.

Rotatably mounted at the center of the rectangular band is a spinner or pointer 15 for indicating different letters. In order that the letters indicated may be easily read without any difference of opinion, radial lines 16 are drawn, extending inward from the lines which divide the rectangular band 13 into a plurality of sections.

Plates 17, which are made in the form of hollow rectangles, shaped for enclosing the rectangular band 13, are provided for mounting on the board. These plates have marked thereon a plurality of objects designed for suggesting words to be spelled. These plates are also shaped so that they fit within the border 11 which forms a background for them, giving the board a pleasing appearance. Mounted at the four corners of the section enclosed by the border 11 are turn-buttons 18 adapted for engaging the plates 17 to retain the latter in position on the game board. Each plate 17 has a series of different objects marked thereon so that the changing of them presents a different group of objects to the players. In marking the objects on the plates, in some cases, it may prove more satisfactory to print the name of the object underneath it. However, in more advanced stages of training the name of the object might be eliminated.

Referring to Figure 3, a score pad of a certain construction is provided for the players to record the letters and the words spelled by the use of those letters. Extending across the top of each sheet of the score pad are two lines of small squares, one designated "Chances" and the other "Letters." The squares designated "Chances" are numbered, indicating the number of times that the player operates the spinner. The squares designated "Letters" are plain and are provided for recording the letters indicated by the spinner each time it operates. Below the lines of squares a portion of the sheet is reserved for recording thereon the words spelled and is designated "Objects spelled."

In playing the game, each player operates the spinner in turn and records the letter indicated by the spinner. The number of times that each player operates the spinner is decided upon before the game is begun. After the players have operated the spinner a predetermined number of times and recorded the letters indicated, they proceed with the spelling of the names of the objects presented by any plate 17 or the area 20 of the game board. The name of each object shown on the plate 17 and spelled by the different players from the letters he has recorded on his score pad are also recorded on the score pad. The player able to spell correctly the names of the greatest number of objects appearing on a plate 17 or the area 20 of the game board wins.

If the names of the objects are not shown on the plate 17 then it becomes necessary for the child to learn to recognize the objects as well as to remember how to spell the names of these objects. In such case, correct powers of observation and the memory are developed in the child.

I would state in conclusion that while the illustrated example constitutes a practical embodiment of my invention I do not limit myself strictly to the exact details herein illustrated since manifestly the same can be considerably varied without departing from the spirit of the invention as defined in the appended claims.

Claims:

1. In an educational game, a game board having a band of letters marked thereon enclosing an area, a spinner mounted in said area for indicating the different letters in said band, a band of objects marked on a plate shaped for enclosing said band of letters, said objects suggesting words for spelling by the use of the letters indicated by the spinner, and means mounted on the board for retaining said plate in position.

2. In an educational game, a game board having a band of letters marked thereon enclosing an area, a spinner mounted in said area for indicating the different letters, plates shaped for enclosing said band of letters, said plates having a plurality of objects marked thereon suggesting words for spelling by the use of the letters indicated by the spinner, and means for retaining said plates in position on the game board.

3. In an educational game, a game board having a band of letters marked thereon enclosing a space, a spinner mounted in said space for indicating different letters, means for recording the letters indicated by the spinner, plates shaped to enclose said band of letters, said plates having a plurality of objects marked thereon for suggesting words for spelling by the use of the recorded letters, and means for retaining the plates in position on the game board.

4. In an educational game, a game board, a rectangular band marked thereon enclosing an area, said band being divided into a plurality of spaces, a letter marked in each space except the corner spaces, a spinner mounted in the area enclosed by said band for indicating the different letters, plates shaped for enclosing said rectangular band, said plates having a plurality of objects marked thereon for suggesting words for spelling by the use of the indicated letters, means for retaining such plates in position on the game board, and a border marked on the game board to enclose said plates, giving the game board an ornate appearance.

5. In an educational game, a game board having a rectangular band marked thereon enclosing an area, said band being divided into a plurality of spaces, each space except the corner spaces having a letter marked thereon, a spinner mounted in said area for indicating the different letters, means for recording the letters indicated, hollow rectangular-shaped plates having a plurality of legends marked thereon indicating words for spelling by the use of the recorded letters, and means for removably mounting said hollow rectangular-shaped plates on the game board.

6. In an educational game, a game board having a band marked thereon enclosing an area, said band being divided into a plurality of sections, each section except the corner sections having marked thereon a letter, a spinner mounted in said enclosed area for indicating the different letters, radial lines marked in said enclosed area and extending to the lines defining the different sections, for assisting in deciding the letter indicated by the spinner, plates shaped for enclosing said rectangular band, each plate having a plurality of legends marked thereon for suggesting words for spelling by the letters indicated by the spinner, and means for removably and interchangeably mounting said plates on the game board.

7. An educational game board having marked thereon a border dividing the game board into two sections and enclosing one section, a band of letters inside the border enclosing a space, and a plurality of objects on the area between the band of letters and the border, and said board having rotatably mounted thereon in the space enclosed by the band of letters a spinner for indicating letters for use in spelling the names of the objects marked in the area between the band of letters and the border.

JAMES H. DEEN.